(No Model.)
H. C. KINNER.
CULTIVATOR.
No. 546,334. Patented Sept. 17, 1895.
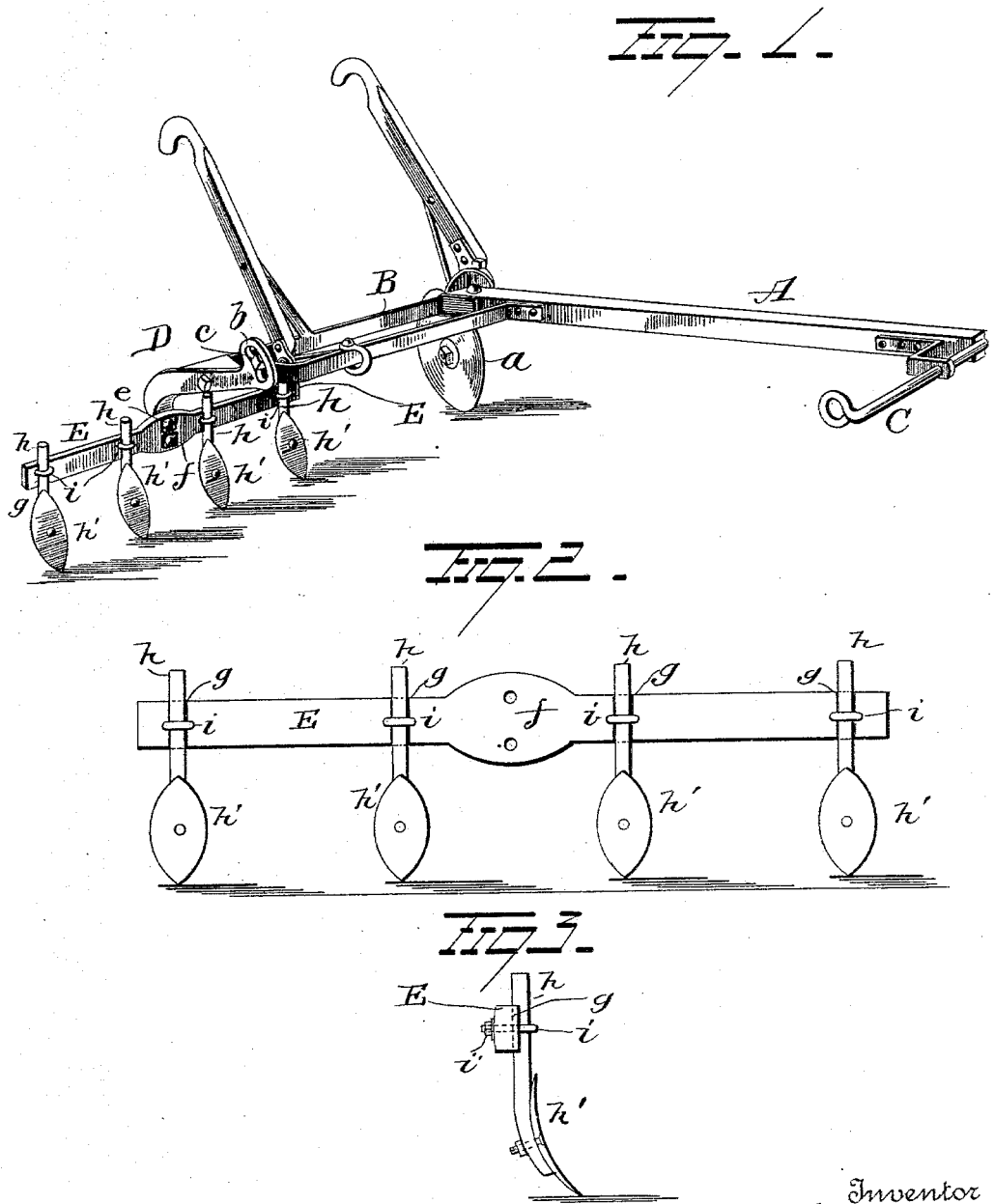

UNITED STATES PATENT OFFICE.

HARMON C. KINNER, OF FREDONIA, NEW YORK.

CULTIVATOR.

SPECIFICATION forming part of Letters Patent No. 546,334, dated September 17, 1895.

Application filed December 29, 1894. Serial No. 533,316. (No model.)

*To all whom it may concern:*

Be it known that I, HARMON C. KINNER, a resident of Fredonia, in the county of Chautauqua and State of New York, have invented certain new and useful Improvements in Cultivators; and I do hereby declare the following to be a full, clear, and exact description of the invention, such as will enable others skilled in the art to which it appertains to make and use the same.

My invention relates to an improvement in cultivators, and more particularly to such as are employed in the cultivation of grapes and berries, the object of the invention being to produce simple and efficient means which can be readily applied to the framework of the machine whereby to cultivate close to the roots of vines and bushes.

With this object in view the invention consists in certain novel features of construction and combinations and arrangements of parts, as hereinafter set forth, and pointed out in the claims.

In the accompanying drawings, Figure 1 is a view of a cultivator embodying my improvements. Figs. 2 and 3 are detail views illustrating my improved attachment.

A represents a tongue or beam, at the rear end of which a wheel (preferably a colter-wheel) $a$ is mounted.

From the rear end of the tongue or beam a bracket B projects some distance laterally, and at the forward end of the beam a draft device C projects therefrom, preferably in a direction parallel with the bracket B. At the free end of the bracket B a shank or stock D is pivotally connected between its ends, the upper end of said shank or stock being made with an elongated slot $b$ for the reception of a pin or projection $c$ on the framework, whereby to permit a limited movement of the shank or stock on its pivot. To the free lower or rear end of the shank D a transverse beam or bar E is secured thereto by means of a clip $e$, the members of said clip passing through the beam and shank and provided with suitable nuts, the attachment of the beam or bar E to the shank being thus made removable and reversible. Where the beam is secured to the shank it is preferably enlarged or widened, as at $f$, so as to produce a broad bearing. The bar or beam E is made with a series of recesses $g$ for the reception of vertically-disposed standards $h$, having cultivator-teeth $h'$ secured at their lower ends, said cultivator-teeth being preferably made in the form of shovels having a point at each end, so that they can be reversed when worn. The standards $h$ are secured to the bar or beam E by means of clips $i$, provided at their projecting ends with nuts $i'$. The standards may be removed and reversed, if desired, by removing the clips, or said clips may be loosened and the standards adjusted vertically.

My improvements are very simple in construction, can be readily applied to the framework of the machine, will operate to cultivate close up to the roots of the vines or bushes, and are effectual in all respects in the performance of their functions.

Having fully described my invention, what I claim as new, and desire to secure by Letters Patent, is—

1. In a cultivator, the combination with a frame, a wheel at one side thereof for the support of the cultivator at that point and a shank at the opposite side, of a transverse beam or bar secured to this shank and carrying a series of cultivator teeth, said bar projecting laterally beyond the end of the shank, substantially as set forth.

2. In a cultivator, the combination with a frame, of a shank pivoted to the frame to move in a vertical plane, means for locking this shank, a bar secured to this shank, said bar projecting laterally beyond the side of the frame and carrying cultivator teeth, substantially as set forth.

3. In a cultivator, the combination with a framework having a laterally projecting portion, of a shank pivoted between its ends to said laterally projecting portion and having an elongated slot at its upper end, a pin projecting from the framework into said slot, a transverse beam secured to the lower end of said shank, and a series of cultivator teeth carried by said beam, substantially as set forth.

In testimony whereof I have signed this specification in the presence of two subscribing witnesses.

HARMON C. KINNER.

Witnesses:
HARRISON PARKER,
FRED W. CASE.